FIG_2_

FIG_3_

INVENTOR.
Zoltan Tarczy-Hornoch
BY
William D. Hager
ATTORNEY

FIG_4

United States Patent Office 2,946,010
Patented July 19, 1960

2,946,010

INHIBITOR CIRCUIT

Zoltan Tarczy-Hornoch, Berkeley, Calif., assignor to Eldorado Electronics Co., Berkeley, Calif., a corporation of California Filed Aug. 18, 1958, Ser. No. 755,767

19 Claims. (Cl. 328—116)

The present invention relates generally to inhibitor circuits, and more particularly to a novel inhibitor circuit having particular application in differential discriminators.

Pulse height analyzers are extensively employed in nuclear research and allied fields for determining the voltage amplitude distribution of large numbers of randomly occurring pulses. Such pulses may be, for example, the pulse output of various nuclear radiation detectors well known in the art (e.g., proportional counters, ion chambers, and the like). Since the amplitudes of the pulses generated by a detector are proportional to the energies of nuclear particles detected, the pulse height distribution as determined by the analyzer provides an indication of the energy spectrum of nuclear particle radiation.

As nuclear research activities have expanded, the need for faster instrumentation has also increased. Of the two basic types of pulse height analyzers or "kick-sorters" available today, the time-conversion type of analyzer is inherently too slow in operation for most fast counting applications. The other type of analyzer, namely, the conventional multiple differential discriminator analyzer, also has been variously disadvantageous in fast counting applications primarily because of the large number of vacuum tubes and complex circuitry required to yield satisfactorily high resolutions in differential discriminators heretofore employed in such analyzers. One of the factors which is responsible for the complexity of design and attendant prohibitive cost of conventional short resolving time differential discriminators is their dependency upon the rise and fall times of the pulses which are to be measured. Previously, in differential discriminators it has been desirable to include a pair of pulse height selective trigger circuits, one biased to trigger when the input pulses are above a minimum (lower) preset level and the other biased to trigger when the pulses are above a maximum (upper) level. The lower trigger circuit is accordingly triggered before and remains triggered after the upper trigger circuit. It has also been desirable to apply the output pulses from the two trigger circuits to an anticoincidence circuit; however the desired anticoincidence action is complicated in that neither the leading nor trailing edges of the respective output pulses from the trigger circuits is coincident in time. In the absence of corrective circuitry, the leading edge of the lower trigger circuit output pulse passes through the anticoincidence circuit before the upper trigger circuit output pulse comes into existence, thus producing an output pulse even when the upper trigger circuit as well as the lower trigger circuit is triggered. Various circuitry has been previously employed with the trigger circuits to provide pulses with at least a set of corresponding edges coincident in time and thereby overcome the foregoing difficulty. Aside from being complex as hereinbefore mentioned, such circuitry has commonly involved time delay or pulse stretching techniques which add materially to the minimum attainable resolving time of the discriminator.

The present invention provides a novel inhibitor circuit which may be employed with suitable upper and lower pulse height selective trigger circuits to yield a differential discriminator wherein the aforementioned difficulties of related prior art devices are eliminated. More particularly, the inhibitor circuit of the present invention results in an improved differential discriminator which employs relatively few tubes in a compact arrangement and yet achieves resolving times substantially less than those heretofore realized with vastly more complicated prior art devices. To accomplish this end, the novel inhibitor circuit is coupled to the outputs of upper and lower pulse height selective trigger circuits, at least the lower one of which exhibits hysteresis action. The inhibitor circuit of the present invention is adapted to extract a hysteresis pulse from a suitable waveform generated in the lower trigger circuit during the hysteresis action and generates an inhibitor pulse in response to triggering of the upper trigger circuit. The inhibitor pulse is initiated prior to the occurrence of the hysteresis pulse and remains during the duration thereof. The inhibitor and hysteresis pulses are then employed in the inhibitor circuit to control the generation of output pulses from the discriminator. Output pulses are generated only in response to a hysteresis pulse occurring in the absence of an inhibitor pulse whereas zero output is produced in response to the simultaneous occurrence of both pulses. Accordingly, an output pulse is only generated when the upper trigger circuit has not been triggered, and vice versa, since the inhibiting action is initiated prior to the extraction of the hysteresis pulse from the lower trigger circuit. The present invention thus accomplishes anticoincidence action within the time duration of the lower trigger circuit selector action and utilizes only the wave forms already present within the trigger circuits. Time resolution is therefore limited only by the resolution of the trigger circuit selector action. A multichannel analyzer employing a plurality of the differential discriminators of the present invention in a parallel array is accordingly relatively simple and compact. Moreover, the dead time of such an analyzer is limited only by the dead time of the selector action of the individual discriminator channels.

It is therefore an object of the present invention to provide an inhibitor circuit which may be employed in a differential discriminator to provide a short resolving time limited only by the dead time of the selector action of the individual discriminator circuits utilized therein.

Another object of this invention is the provision of a simple compact differential discriminator circuit which utilizes a minimum of vacuum tubes.

Still another object of the invention is to provide a novel inhibitor circuit in a differential discriminator whose operation is thereby not adversely affected by the rise and fall time of pulses to be measured.

Yet another object of the present invention is to provide a multiple differential discriminator pulse height analyzer which overcomes the problem of anticoincidence circuitry introduced by channels having different triggering times without increasing the dead time of the system.

An important object of the present invention is the provision of a novel inhibitor circuit resulting in a pulse height analyzer which is capable of determining pulse heights at extremely fast counting rates with low counting losses.

A further object of this invention is to provide a reliable fast pulse height analyzer, the reliability of which is enhanced by the small number of components employed therein.

Additional objects and advantages of the invention will become apparent from the following description taken in conjunction with the accompanying drawings, of which.

Figure 1:
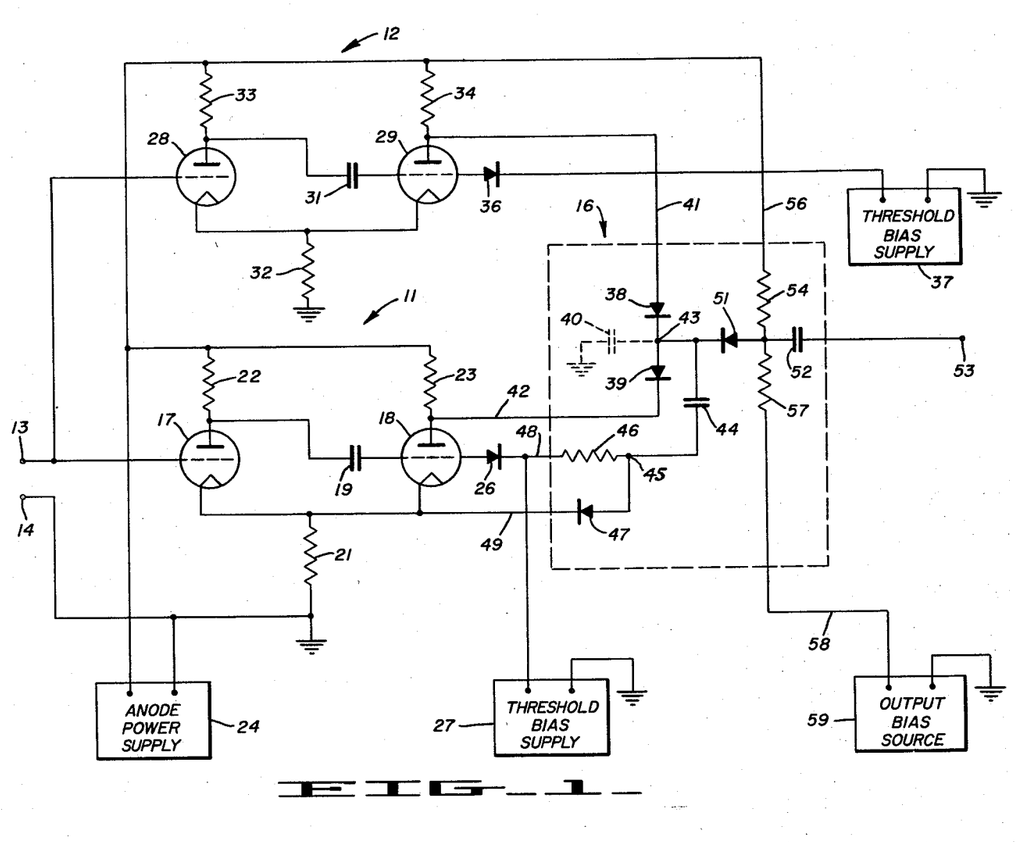
Figure 1 is a schematic circuit diagram of a preferred embodiment of an inhibitor circuit in accordance with the present invention as applied in a differential discriminator.

Considering now the invention in some detail and referring to the illustrated form thereof in the drawings, Figure 1 in particular, there is provided generally a differential discriminator including lower and upper pulse height selective trigger circuits 11, 12 coupled in parallel to input terminals 13, 14; the latter one of which is connected to ground. Lower and upper trigger circuits 11, 12 are respectively preset to trigger at lower and upper voltage levels in response to input pulses of corresponding amplitude applied to terminals 13, 14. A pulse having an amplitude intermediate the lower and upper voltage levels triggers only the lower trigger circuit 11, whereas a pulse with an amplitude greater than the upper voltage level triggers first the lower trigger circuit 11 and then after a time interval due to the rise time of the input pulse triggers the upper trigger circuit 12. The resulting output pulse from upper trigger circuit 12 is terminated prior to termination of the output pulse from lower trigger circuit 11 due to the finite fall time of the trailing edge of the input pulse. Accordingly, neither the respective leading edges of the output pulses from trigger circuit 11, 12 nor the respective trailing edges thereof are coincident in time and accordingly are not suited to anticoincidence action.

In order to provide pulses from trigger circuits 11, 12 which are coincident in time, at least the lower trigger circuit 11 of the present invention is of a type which exhibits hysteresis action such that during the triggered state of such circuit one of the waveforms generated therein includes by virtue of the hysteresis action a notch or spike of relatively short duration which occurs just prior to return of the circuit to the untriggered state thereof. In addition an inhibitor circuit 16 in accordance with the present invention is coupled between trigger circuts 11, 12 and is adapted to extract the hysteresis spike from the above-noted waveform generated in trigger circuit 11 and responsively generate a pulse of corresponding configuration; such pulse being hereinafter referred to as a hysteresis pulse. Inhibitor circuit 16 also is arranged to generate an inhibitor pulse which is initiated substantially coincidently with the triggering of upper trigger circuit 12 and is terminated substantially coincidently with the return of lower trigger circuit 11 to its untriggered state. The inhibitor pulse accordingly overlaps the hysteresis pulse and therefore they may be employed in inhibitor circuit 16 for direct anticoincidence action as is subsequently described.

More particularly, as regards trigger circuits 11, 12, it is to be noted that they are preferably provided as generally conventional A.C. coupled Schmitt trigger circuits. Therefore, lower trigger circuit 11 includes first and second triodes 17, 18 with the anode of the first coupled by means of a capacitor 19 to the grid of the second. The cathodes of triodes 17, 18 are commonly connected through a cathode resistor 21 to ground and the anodes thereof are respectively connected in the conventional manner through load resistors 22, 23 to a source of anode operating potential as shown generally at 24. The grid of triode 17 is connected to input terminal 13 and the grid of triode 18 is connected to the positive terminal (anode) of a diode 26; the negative terminal (cathode) of which is coupled to a threshold bias supply shown generally at 27. Such threshold bias supply 27 determines the triggering voltage level of lower trigger circuit 11 and may be preset to a desired value. A pulse applied to input terminals 13, 14 and having an amplitude greater than the triggering level effects generation of an output pulse at the anode of second triode 18 and generation of the waveform including the hysteresis spike of previous mention at the common cathode connection of triodes 17, 18.

Trigger circuit 12 is similarly provided as a Schmitt circuit comprising first and second triodes 28, 29 with the anode of the first connected through a capacitor 31 to the grid of the second. The cathodes of triodes 28, 29 are paired and connected to one side of a cathode resistor 32; the other side of which is connected to ground. The anodes of triodes 28, 29 are respectively connected through plate load resistors 33, 34 to anode operating supply 24. The grid of triode 29 is connected to the positive terminal of a diode 36 having its negative terminal connected to a threshold bias source shown generally at 37; and the grid of triode 28 is connected to input terminal 13. Threshold bias source 37 thus establishes in upper trigger circuit 12, substantially any desired triggering potential greater than that of lower trigger circuit threshold source 27. Pulses applied to input terminals 13, 14 having amplitudes greater than the preset potential of threshold source 37 thus trigger upper trigger circuit 12 subsequent to triggering lower trigger circuit 11 and effect generation of an output pulse at the anode of triode 29.

Considering now the novel inhibitor circuit 16 of the present invention and particularly the means included therein for generating an inhibitor pulse, such means preferably comprises a pair of diodes 38, 39 serially connected between the anodes of triodes 18 and 29. The positive terminal of diode 38 is connected to the anode of triode 29 by means of conductor 41 and the negative terminal of diode 39 is connected to the anode of triode 18 by means of conductor 42. The junction point 43 between diodes 38, 39 is capacitively coupled to ground preferably by means of the stray capacity 40 inherently existing at such junction 43. Upon the occurrence of the leading edge of an output pulse at the anode of upper trigger circuit triode 29, stray capacity 40 begins to charge rapidly along a current path through resistor 34 and diode 38 to ground. Thus during the rise time of the leading edge of the output pulse from triode 29, stray capacitance 40 charges to a potential substantially equal to that of anode power supply 24. The charge on capacitance 40 and the potential thereby established at junction 43 are retained until diode 39 is rendered conducting by the trailing edge of an output pulse at the anode of lower trigger circuit triode 18. The resulting inhibitor pulse established at junction 43 is accordingly initiated only in response to triggering of upper trigger circuit 12 and persists in time until lower trigger circuit 11 is restored to its original untriggered state.

The juncton point 43 between diodes 38, 39 is also coupled by a capacitance 44 to a junction point 45 between a resistor 46 and the positive terminal of a diode 47. The opposite side of resistor 46 is in turn connected by means of conductor 48 to threshold bias supply 27 and the negative terminal of diode 47 is connected by conductor 49 to the common cathode connection of triodes 17, 18. Resistor 46 and diode 47 as connected in this manner comprise means for extracting the hysteresis pulse of previous mention from the waveform at the common cathode connection of the triodes 17, 18, with such hysteresis pulse appearing at junction 45. More specifically, the waveform at the common cathodes of triodes 17, 18 during the triggered state thereof is a positive pulse including a negative going spike due to the hysteresis action just prior to restoration of trigger circuit 11 to the untriggered state thereof. Although the positive potential of threshold bias supply 27 is applied to the positive terminal of diode 47, the positive portion of the common cathode waveform as applied to the negative terminal of the diode is sufficiently great to render the diode non-conducting. Upon the occurrence of the negative going spike in the cathode waveform, however, the negative terminal of diode 47 thereby becomes negative and the diode is rendered conducting for the duration of such spike. Inasmuch as current flows through diode 47 and resistor 46 at this time, a negative hysteresis pulse is responsively generated at junction 45 or is in effect extracted from the common cathode waveform of triodes 17, 18. Such hysteresis pulse is, moreover, applied through capacitance 44 to junction point 43.

Inhibitor pulses and hysteresis pulses appearing at junction 43 in the manner hereinbefore described are employed for direct anticoincidence action in inhibitor circuit 16 and such anticoincidence action is accomplished by suitable anticoincidence means coupled to junction 43. Such means preferably includes a level sensing diode 51 having its negative terminal connected to junction 43 and its positive terminal coupled as by means of a capacitor 52 to a suitable output terminal 53 to facilitate connection to a scaler, count rate meter, or equivalent counting equipment. Diode 51 is appropriately biased to transmit a negative hysteresis pulse when appearing alone at junction 43 and to block a hysteresis pulse when combined with an inhibitor pulse appearing coincidently at the junction. Such biasing is acomplished as by means of a bias resistor 54 having one side connected through conductor 56 to anode supply 24 and the other side connected to the positive terminal of diode 51. A second bias resistor 57 is also provided with one side connected to such positive terminal and the other side connected through conductor 58 to a positive output bias source 59. Diode 51 is rendered conducting to establish a pulse at output terminal 53 when a negative hysteresis pulse appears alone at junction 43 but is cut off to produce zero output at terminal 53 by the appearance of a positive combination pulse as results from the occurrence of a hysteresis pulse in the presence of an inhibitor pulse at junction 43.

Figure 2:
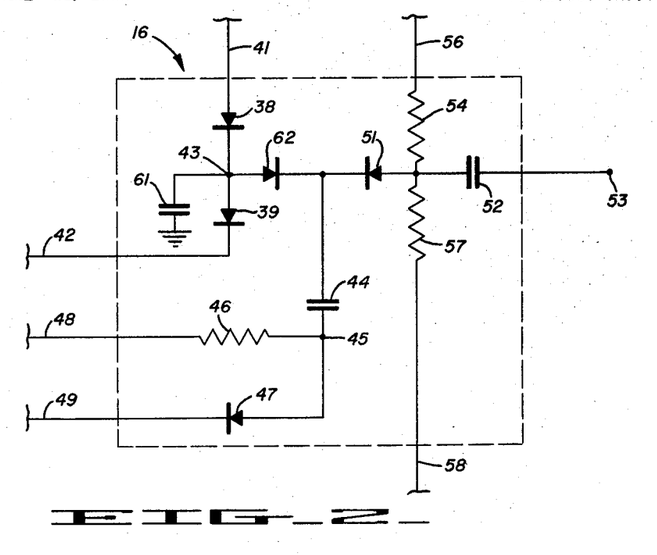
Figure 2 is a schematic circuit diagram of an alternative inhibitor circuit in accordance with the instant invention which may be employed in the embodiment of Figure 1.

It will be appreciated that various alternative circuits may be employed as the present invention and in this connection reference may be had to Figure 2 of the drawings wherein there is shown one such alternative with like numerals representing like elements of Figure 1. As shown in Figure 2, there is provided alternative means for generating an inhibitor pulse of the type previously described. Such means comprises a capacitor 61 (comparable to stray capacity 40 of the embodiment of Figure 1) connected between junction 53 and ground and a diode 62 having its positive terminal connected to junction 43 and its negative terminal connected to the negative terminal of diode 51. In addition, the side of capacitance 44 formerly connected directly to junction 43 in the embodiment of Figure 1, is connected to the negative terminal of diode 62 in the alternative embodiment of Figure 2. Accordingly, upon the occurrence of the leading edge of an output pulse at the anode of upper trigger circuit triode 29, diode 38 is rendered conducting and capacitor 61 charges rapidly through such diode 38 and conductor 41 to initiate a positive inhibitor pulse of the type previously described at junction 43. The inhibitor pulse persists at junction 43 until diode 39 is rendered conducting by the trailing edge of an output pulse at the anode of lower trigger circuit triode 18. Capacitor 61 then discharges through diode 39 and conductor 42 to thereby terminate the inhibitor pulse at junction 43. The inhibitor pulses thus generated at junction 43 and hysteresis pulses generated at junction 45 are employed in the present embodiment to operate novel pulse controlled multidirectional switch means which produces an anticoincidence action between such inhibitor and hysteresis pulses in a manner equivalent to that occurring in the embodiment of Figure 1. More particularly, the multidirectional switch means includes diode 62, level sensing diode 51, and capacitance 44 having one side connected to the juncture between such diodes. In addition the values of bias resistors 54, 57 are chosen relative to the output voltage magnitudes of anode power supply 24 and output bias source 59 such that the bias thereby established at the positive terminal of diode 51 is intermediate the base and crest potentials of the inhibitor pulses applied to the positive terminal of diode 62 from junction 43. With the multidirectional switching means so biased, the inhibitor pulses applied to diode 62 control the conduction paths of hysteresis pulses through the switching means. More specifically, in the absence of an inhibitor pulse at the positive terminal of diode 62, the base potential thus existing thereat is of a sufficiently low value compared to the intermediate bias at the positive terminal of diode 51 that the resultant potential produced at the junction between diodes 62, 51 in the presence of a hysteresis pulse applied to capacitance 44 renders diode 62 non-conducting while rendering diode 51 conducting for the duration of the hysteresis pulse. Under such conditions an output pulse is generated at output terminal 53.

Conversely, in the presence of an inhibitor pulse at the positive terminal of diode 62, the crest potential of the inhibitor pulse appearing thereat is of a sufficiently high value compared to the intermediate bias at the positive terminal of diode 51 that the resultant potential produced at the junction between diodes 62, 51 in the presence of a hysteresis pulse applied to capacitance 44 renders diode 62 conducting and diode 51 non-conducting. The hysteresis pulse accordingly passes through diode 62 partially discharging capacitance 61 and, at the same time, zero output occurs at output terminal 53. The multidirection switching means thus produces an anticoincidence action with the hysteresis pulses being, in effect, passed to output terminal 53 only in the absence of inhibitor pulses and blocked from such output terminal during the coincident presence of inhibitor pulses.

Figure 3:
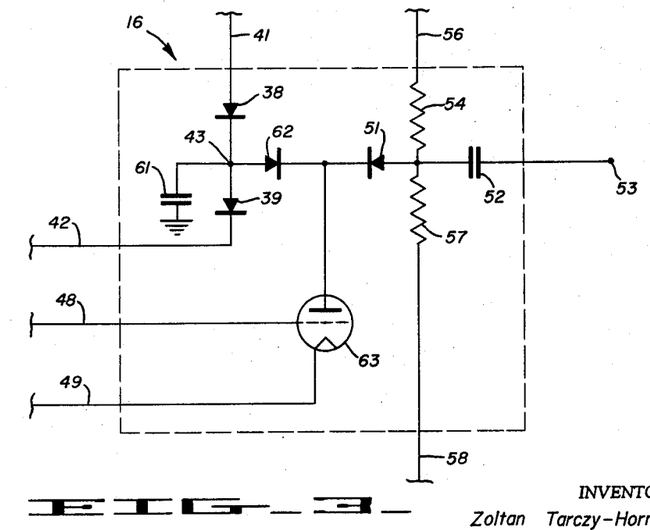
Figure 3 is a schematic circuit diagram of still another alternative inhibitor circuit which may be employed in the embodiment of Figure 1.

Considering now still another alternative inhibitor circuit in accordance with the present invention, it is to be noted that the embodment of Figure 2 may be modified as illustrated in Figure 3. As shown therein, capacitance 44, resistor 46, and diode 47 of the embodiment of Figure 2 are replaced by a triode 63. More specifically, the cathode and grid of triode 63 are respectively connected to conductors 49 and 48. The anode of such triode is connected to the junction of diodes 62, 51. Accordingly, the grid of triode 63 is maintained at the potential of lower threshold bias supply 27 or alternative supply and the cathode is coupled to the common cathode connection of lower trigger circuit triodes 17, 18.

Triode 63 is in this manner biased to conduct only in response to the negative spike due to hysteresis appearing in the waveform at the common cathodes of lower trigger circuit triodes 17, 18. During such spike, a hysteresis pulse is responsively generated at the anode of triode 63 and is consequently applied to the pulse controlled multi-directional switching means including diode 62 and level sensing diode 51. The circuit thereafter functions in the manner previously described with the switching means producing an anticoincidence action between the hysteresis and inhibitor pulses applied thereto. The hysteresis pulses appear at the anode of triode 63 and are consequently applied to the negative terminal of anticoincidence diode 51 for mixing with inhibitor pulses coupled thereto from diode 62. Anticoincidence circuit 16 thereafter functions in the manner previously described.

Figure 4:
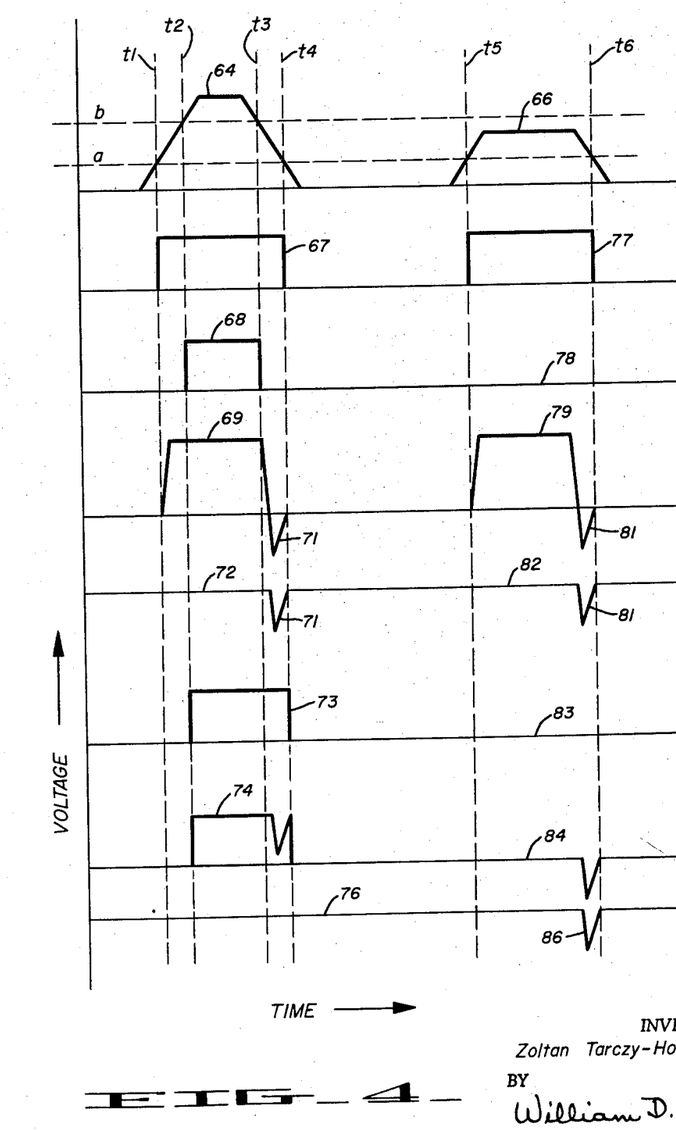
Figure 4 is a chart of wave forms exhibited at various points in the circuit of Figure 1.

The operation of the inhibitor circuit of the present invention as embodied in the pulse discriminator circuit physically described hereinbefore will be better understood by reference to Figure 4 which illustrates idealized waveforms appearing at various points in the circuit. As shown in the figure, waveforms 64, 66 depict two typical input pulses to be measured as applied to input terminals 13, 14. Both pulses have finite rise and fall times and the first waveform 64 has an amplitude which exceeds both the threshold triggering potential level ($a$) and threshold triggering level ($b$) as respectively preset in lower and upper trigger circuits 11, 12 by threshold bias sources 27, 37. The second waveform 66 exceeds the lower trigger circuit threshold level ($a$) but not the upper trigger circuit threshold level ($b$).

Considering first the operation of the circuit with waveform 64 appearing at input terminal 13, 14, it will be noted that at time $t_1$, the leading edge of pulse 64 is equal to threshold level ($a$) thereby triggering lower trigger circuit 11. A pulse 67 is thereby responsively initiated at the anode of triode 18. Similarly a pulse 68 is initiated at the anode of triode 29 at a time $t_2$ when the leading edge of pulse 64 is equal to threshold level ($b$). Pulse 68 is terminated at a time $t_3$ which corresponds to the instant the trailing edge of input pulse 64 is substantially equal to threshold level ($b$). Similarly, at a later time $t_4$ when the trailing edge of input pulse 64 is substantially equal to threshold level ($a$), lower trigger circuit 11 is cut off and pulse 67 is terminated.

It will be appreciated that although the cut-off threshold levels of trigger circuits 11, 12 are ideally depicted in the figure as corresponding to the threshold triggering levels ($a$) and ($b$) respectively thereof, in actual practice the cut-off levels are somewhat lower than the corresponding triggering levels of the respective trigger circuits. More specifically, the cutoff threshold level of trigger circuit 11 is, in reality, slightly lower than triggering level ($a$) by the hysteresis of the circuit. Similarly, the cut-off threshold level of trigger circuit 12 is actually slightly lower than the corresponding triggering level ($b$). A detailed description of this hysteresis phenomenon may be found for example in Pulse and Digital Circuits by Millman and Taub, McGraw-Hill, 1956, page 166 et seq., and accordingly is not discussed in detail herein. By virtue of the hysteresis of trigger circuits 11, 12 and correspondingly decreased values of the cut-off threshold levels, the termination times $t_3$, $t_4$ of pulses 68, 67 respectively in actual practice occur slightly later than depicted in the idealized waveforms of the figure. For the purposes of simplicity and clarity in the ensuing description of operation, however, it is believed that the illustrated idealized waveforms suffice.

Continuing now with the description of operation relative to the idealized waveforms, the voltage waveforms at the common cathode connection of lower trigger circuit 11 corresponding to the output pulse 67 therefrom is depicted by waveform 69. It will be noted that just prior to time, $t_4$, hysteresis action occurs in the trigger circuit 11 resulting in the formation of a negative hysteresis spike 71 in the cathode waveform 69. Waveform 69 is applied to diode 47 (or triode 63 in the alternative circuit of Figure 3) and the resultant waveform 72 at the output thereof consists of only the negative hysteresis spike or pulse 71, which pulse is applied to the negative terminal of level sensing diode 51.

Coincident with the leading edge of the pulse 68 initiated in upper trigger circuit 12 at time, $t_2$, diode 38 conducts and a positive inhibitor pulse 73 is initiated at junction 43 in any of the various embodiments of the invention hereinbefore described (see Figures 1, 2, 3). The inhibitor pulse 73 persists until time, $t_4$, when the pulse is terminated by conduction of diode 39 in response to the trailing edge of output pulse 67 generated at the anode of lower trigger circuit triode 18. The resultant waveform at junction 43 is accordingly as depicted by pulse waveform 74 for the embodiment of Figure 1. Pulse 74 has a positive amplitude substantially equal to that of inhibitor pulse 73 from time, $t_2$, to the occurrence of hysteresis pulse 71 at which time pulse 74 decreases rapidly to a less positive potential and is thereafter terminated at time $t_4$. Pulse 74 is thus positive over its entire duration and accordingly does not render the level sensing diode 51 coupled to junction 43 conducting inasmuch as such diode is biased in the manner previously described to pass only negative pulses. The resultant output at terminal 53 is, therefore zero as depicted by waveform 76. The inhibitor pulse at junction 43 and hysteresis pulse coupled to the negative terminal of diode 51 in the embodiments of Figures 2 and 3 operate the pulse controlled switching means of such embodiments to similarly produce zero output at output terminal 53.

Considering now the operation of the circuit of the present invention with pulse 66 applied to input terminals 13, 14, it will be noted that at time, $t_5$, the leading edge of pulse 66 is equal to threshold level ($a$) thereby triggering lower trigger circuit 11. A pulse 77 is thereby responsively initiated at the anode of triode 18 and the pulse is terminated at time, $t_6$, when the trailing edge of input pulse 66 passes through the cut-off threshold level substantially equal to level ($a$). It will be noted that pulse 77 is substantially identical to pulse 67 generated in response to input pulse 64 as previously described. Inasmuch as the peak amplitude of input pulse 66 is less than the threshold level ($b$) of upper trigger circuit 12, such trigger circuit is not triggered and the output waveform 78 therefrom is zero.

The voltage waveform 79 at the common cathode connection of lower trigger circuit 11 corresponding to the output pulse 77 therefrom is substantially identical to the waveform 69 of previous mention. A negative hysteresis spike 81 appears in the cathode waveform 79 just prior to time $t_6$. The negative spike 81 is extracted from the cathode waveform 79 by the action of diode 47 or equivalent means whereby only the negative hysteresis pulse 81 is applied to the negative terminal of level sensing diode 51 as depicted by waveform 82. Since the output waveform 78 in upper trigger circuit 12 is zero, diode 38 is not rendered conducting and no inhibitor pulse as depicted by waveform 83 is applied to junction 43. The resultant waveform 84 at the negative terminal of diode 51 in the embodiment of Figure 1 accordingly only includes the negative hysteresis pulse. The diode 51 is thereby rendered conducting for the duration of the negative hysteresis pulse and a negative pulse 86 is responsively produced at output terminal 53. Similarly in the instances of the embodiments of Figures 2 and 3, the absence of an inhibitor pulse at junction 43 and presence of a hysteresis pulse operate the pulse controlled switching means of such embodiments to produce a negative pulse at terminal 53.

Figure 5:
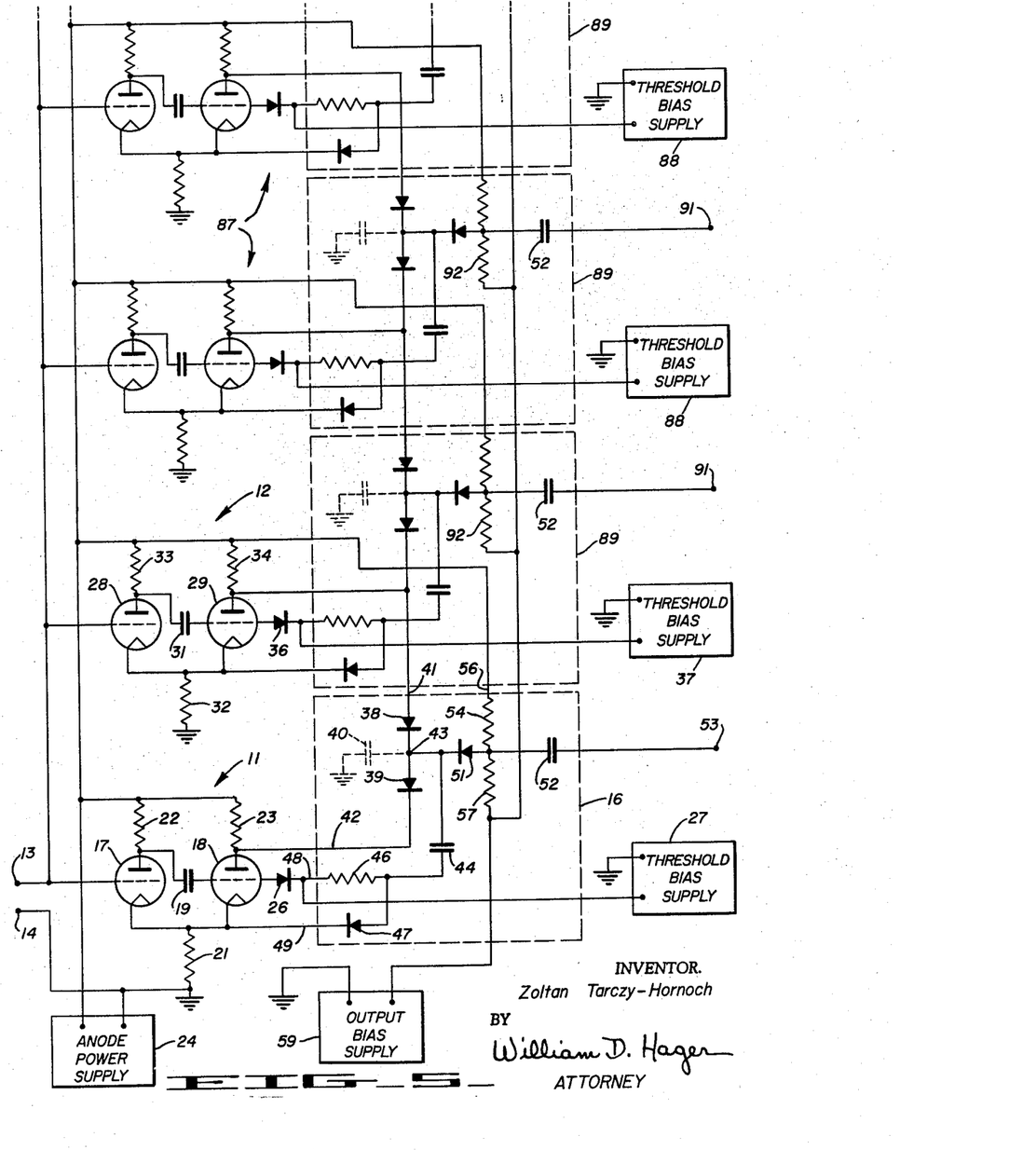
Figure 5 is a schematic circuit diagram of the differential discriminator utilizing the inhibitor circuit of the present invention as employed in a multichannel pulse height analyzer.

From the foregoing description, it is to be noted that a differential discriminator using the inhibitor circuit of the present invention reliably produces zero output at terminal 53 in response to input pulses applied to terminals 13, 14 having amplitudes greater than the predetermined upper threshold lever set by threshold bias supply 37. Input pulses having amplitudes less than the preset level of threshold bias supply 37 but greater than the predetermined level set by lower threshold bias supply 27 reliably produce output pulses at terminal 53. Moreover, the anticoincidence action in the novel inhibitor circuit 16 of the present invention in producing the desired output at terminal 53 takes place within the time duration of the discriminator action of lower trigger circuit 12 (i.e., between times $t_1$ and $t_4$, $t_5$ and $t_6$ of Figure 4). The overall time resolution of the differential discriminator circuit is thus limited only by the relatively short time interval, $t_1$–$t_4$, or $t_5$–$t_6$, of the trigger circuit discriminator action. The short resolving time single channel differential discriminator embodied in Figure 1 may accordingly be paralleled with like discriminator circuits as shown in Figure 5 to provide a multichannel differential discriminator or pulse height analyzer having a short dead time substantially equal to the dead time of the individual discriminator channels. More particularly, as shown in Figure 5, a plurality of additional Schmitt trigger circuits 87 are paralleled with the trigger circuits 11, 12 of the single channel discriminator of Figure 1. The inputs to such trigger circuits 87 are commonly connected to input terminal 13, 14 in similar fashion to the input connections to trigger circuits 11, 12. The anodes of the triodes of trigger circuits 87 are similarly commonly coupled to anode power supply 24 in order to provide anode operating potential to such triodes. The additional trigger circuits 87 are biased to progressively higher triggering levels by means of a corresponding plurality of threshold bias supplies 88. Bias supplies 88 are coupled to the triodes of trigger circuits 87 in a manner similar to the connections of threshold bias supplies 27, 37 to trigger circuits 11, 12. Moreover, each adjacent pair of trigger circuits 87 are connected to an inhibitor circuit 89 in accordance with the present invention and identical to the inhibitor circuit 16 of prevous mention connected between trigger circuits 11, 12. The outputs of inhibitor circuits 89 are in turn coupled to a corresponding plurality of output terminals 91 and the output bias resistors 92 of inhibitor circuits 89 are commonly coupled to output bias source 59 in similar fashion to bias resistor 57 of inhibitor circuit 16. Each adjacent pair of trigger circuits 87 and inhibitor circuit 89, connected therebetween, thus comprise an additional differentially biased discrminator channel identical to the single channel hereinbefore described, including trigger circuits 11, 12 and inhibitor circuit 16. Thus each one of a plurality of pulses to be sorted according to height applied to input terminals 13, 14 directly, or in some instances from a linear pulse shaping amplifier, produces an output pulse at the particular one of output terminals 53, 91 coupled to the particular discriminator channel which has lower and upper threshold triggering potentials between which the pulse amplitude potential resides. The number of pulses appearing at each of the output terminals 53, 91 thus provides an indication of the amplitude spectrum of input pulses applied to terminals 13, 14. Various readout elements may accordingly be advantageously connected to terminals 53, 91 to provide a ready indication of the total pulse count in each channel. For example, a plurality of digital scalers, rate meters, or the like may be correspondingly connected to the channel terminals 53, 91 to provide visual readout in decimal or analogue form. By virtue of the short dead time of the individual differential discriminator channels including the inhibitor circuits of the present invention and the correspondingly short dead time of the multichannel discriminator, the resulting pulse height spectrum is obtained at higher counting rates with a lower counting loss than possible with conventional multichannel discriminators having substantially longer dead times.

While there has been described in the foregoing what may be considered to be preferred embodiments of the invention, modifications may be made therein without departing from the teachings of the invention and it is therefore intended to cover all such as fall within the scope of the appended claims.

What is claimed is:

1. An inhibitor circuit comprising input means for receiving a first pulse, second input means for receiving a second pulse initiated subsequent to initiation of said first pulse and terminating prior to termination of said first pulse, third input means for receiving a third pulse initiated and terminated prior to termination of said first pulse, inhibitor pulse generating means coupled between said first and second input terminals for generating an inhibitor pulse in response to initiation of said second pulse and terminating said inhibitor pulse in response to termination of said first pulse, and anti-coincidence means coupled between said third input means and said inhibitor pulse generating means for producing an output pulse in response to occurrence of said third pulse in the absence of said inhibitor pulse and zero output in the presence thereof.

2. An inhibitor circuit comprising input means for receiving pulses, second input means for receiving second pulses, each of said second pulses related to a corresponding one of the first pulses by the leading edge of the second succeeding the leading edge of the first and the trailing edge of the second preceding the trailing edge of the first, a capacitance having one side coupled to ground, a diode connected between the other side of said capacitance and said second input means, said diode rendered conductng in response to the leading edge of each of said second pulses to thereby initiate an inhibitor pulse at the junction of the diode and capacitance, a second diode connected between said junction and said first input means, said second diode rendered conducting in response to the trailing ege of each of said first pulses to thereby terminate said inhibitor pulse at said junction, third input means for receiving third pulses with each one thereof being related to a corresponding one of said first pulses by the leading edge of the third preceding the trailing edge of the first and the trailing edge of the third coinciding with the trailing edge of the first, and anticoincidence means coupled between said third input means and said junction for producing an output pulse in response to the occurrence of one of said third pulses in the absence of an inhibitor pulse at said junction and zero output in the presence thereof.

3. An inhibitor circuit as defiined by claim 2 further defined by said anticoincidence means comprising a capacitance connected between said third input means and said junction to couple said third pulses thereto, and a level sensing element connected to said junction and biased to conduct and produce an output pulse in response to the occurrence of one of said third pulses at said junction in the absence of an inhibitor pulse thereat and to be non-conductive in response to the simultaneous occurrence of one of said third pulses and an inhibitor pulse at said junction.

4. An inhibitor circuit as defined by claim 2 further defined by said anticoincidence means comprising first and second opposing diodes serially connected to said junction, a capacitance connected to between said third input means and the junction of said first and second opposing diodes, and bias means connected to said second opposing diode to bias same to a level intermediate the base and crest levels of said inhibitor pulses.

5. Pulse controlled multidirectional switching means comprising first and second diodes with the negative terminal of the first connected to the negative terminal of the second, a capacitance connected to the junction of said first and second diodes, input means connected to said capacitance for receiving negative pulses, means for applying positive control pulses to the positive terminal of said first diode with the amplitude of each control pulse above a positive base level being greater than the negative amplitude of the negative pulses, bias means coupled to the positive terminal of said second diode for maintaining a positive bias thereon of a level intermediate the base and crest levels of said control pulses, and output terminal means coupled to the positive terminal of said second diode.

6. A differential discriminator comprising a trigger circuit preset to trigger at a first potential level and generating a hysteresis pulse subsequent to triggering, a second trigger circuit preset to trigger at a second potential level greater than said first potential level, common input means connected to said first and second trigger circuits to apply voltage pulses thereto, and an inhibitor circuit coupled to said first and second trigger circuits and including means for generating an inhibitor pulse in response to triggering of said second trigger circuit with the inhibitor pulse persisting during the hysteresis pulse duration, said inhibitor circuit further including anticoincidence means coupled in receiving relation to said hysteresis pulse and said inhibitor pulse for generating an output pulse only in response to said hysteresis pulse alone.

7. A single channel pulse height analyzer comprising lower and upper pulse height selective trigger circuits fed from a common source of pulses, said lower and upper trigger circuits respectively biased to trigger at lower and upper potential levels and responsively generate output pulses, said lower trigger circuit being of a type which exhibits hysteresis action to generate a hysteresis pulse just prior to the trailing edge of the ouptut pulse therefrom, anticoincidence means coupled to said lower trigger circuit for passing said hysteresis pulse for counting, pulse generating means coupled between the outputs of said lower and upper trigger circuits for producing an inhibitor pulse extending in time between the leading edge of the upper output pulse and the trailing edge of the lower output pulse, and means coupling said inhibitor pulse to said anticoincidence means for blocking passage of said hysteresis pulse therefrom.

8. A differential discriminator comprising lower and upper Schmitt trigger circuits each including first and second vacuum tubes having at least anode, grid, and cathode elements with the anode of the first coupled to the grid of the second vacuum tubes and the cathodes commonly connected through a cathode resistor to ground, the grids of the first vacuum tubes of said lower and upper trigger circuits fed from a common source of pulses, threshold bias means coupled to said lower and upper trigger circuits to bias same to predetermined threshold trigger levels, an anticoincidence circuit having a first input terminal connected to the cathodes of the lower trigger circuit vacuum tubes and a second input terminal, said anticoincidence circuit passing a pulse for counting in response to a pulse at one of said input terminals, said anticoincidence circuit producing zero output in response to simultaneous pulses at both of said input terminals, and inhibitor pulse generating means coupled to the anodes of the second vacuum tubes of said upper and lower trigger circuits and to the second input terminal of said anticoincidence circuit, said pulse generating means producing an inhibitor pulse on the leading edge of pulses produced at the second tube anode of said upper trigger circuit and terminating the inhibitor pulse on the trailing edge of pulses produced at the second tube anode of said lower trigger circuit.

9. A differential discriminator as defined by claim 8 wherein said inhibitor pulse generating means comprises a diode having its positive terminal connected to the anode of the second vacuum tube of said upper trigger circuit, a second diode having its negative terminal connected to the anode of the second vacuum tube of said lower trigger circuit and its positive terminal connected to the negative terminal of said first diode, and a capacitance coupled between the junction of said first and second diodes and said threshold bias means, said junction coupled to the second input terminal of said anticoincidence circuit.

10. A differential discriminator as defined by claim 8 wherein said inhibitor pulse generating means comprises a diode having its positive terminal connected to the anode of the second vacuum tube of said upper trigger circuit, a second diode having its negative terminal connected to the anode of the second vacuum tube of said lower trigger circuit and its positive terminal connected to the negative terminal of said first diode, and a capacitance having one side connected to the junction of said first and second diodes and the other side connected to ground, said junction coupled to the second input terminal of said anticoincidence circuit.

11. A differential discriminator comprising lower and upper Schmitt trigger circuits each including first and second vacuum tubes having at least anode, grid, and cathode elements with the anode of the first coupled to the grid of the second vacuum tube and the anodes of the first and second tubes coupled to a source of operating potential, the cathodes of said first and second vacuum tubes being commonly connected through a resistor to ground, threshold bias means coupled to said lower trigger circuit to bias same to a predetermined lower triggering potential, second threshold bias means coupled to said upper trigger circuit to bias same to a predetermined upper triggering potential, input terminal means commonly coupled to the grids of the first vacuum tubes of said lower and upper trigger circuits respectively, a diode having its positive terminal connected to the anode of the second vacuum tube of said upper trigger circuit, a second diode having its negative terminal connected to the anode of the second vacuum tube of said lower trigger circuit and its positive terminal connected to the negative terminal of said first diode, a clamping diode having its negative terminal connected to the cathodes of the lower trigger circuit vacuum tubes, positive bias means connected to the positive terminal of said clamping diode, a capacitance coupled between the junction of said first and second diodes and the positive terminal of said clamping diode, and anticoincidence output means coupled to said junction.

12. A differential discriminator as defined by claim 11, further defined by said anticoincidence output means comprising a diode having its negative terminal connected to said junction, a bias resistor connected between the positive terminal of said diode and said source of operating potential, an output bias source, an output resistor connected between said output bias source and the positive terminal of said diode, and output terminal means coupled to the positive terminal of said diode.

13. A differential discriminator comprising lower and upper Schmitt trigger circuits each including first and second vacuum tubes having at least anode, grid, and cathode elements with the anode of the first coupled to the grid of the second vacuum tube and the anodes of the first and second tubes coupled to a source of operating potential, the cathodes of said first and second vacuum tubes being commonly connected through a resistor to ground, threshold bias means coupled to said lower trigger circuit to bias same to a predetermined lower triggering potential, second threshold bias means coupled to said upper trigger circuit to bias same to a predetermined upper triggering potential, input terminal means commonly coupled to the grids of the first vacuum tubes of said lower and upper trigger circuits respectively, a diode having its positive terminal connected to the anode of the second vacuum tube of said upper trigger circuit, a second diode having its negative terminal connected to the anode of the second vacuum tube of said lower trigger circuit and its positive terminal connected to the negative terminal of said first diode, a capacitor having one side connected to the junction of said first and second diodes and the other side connected to ground, a third diode having its positive terminal connected to said junction, a fourth diode having its negative terminal connected to the cathodes of the lower trigger circuit vacuum tubes and its positive terminal capacitively coupled to the negative terminal of said third diode, a resistor connected between the positive terminal of said fourth diode and said first threshold bias means, a fifth diode having its negative terminal connected to the negative terminal of said third diode, means connected to the positive terminal of said fifth diode to apply a positive bias potential thereto, and output means coupled to the positive terminal of said fifth diode.

14. A differential discriminator comprising lower and upper Schmitt trigger circuits each including first and second vacuum tubes having at least anode, grid, and cathode elements with the anode of the first capacitively coupled to the grid of the second vacuum tube and the anodes of the first and second tubes coupled to a source of anode bias potential, the cathodes of the first and second vacuum tubes of each trigger circuit being commonly connected through a cathode resistor to ground, the grids of the lower and upper trigger circuit first vacuum tubes fed from a common source of pulses, first and second threshold bias means respectively coupled to said lower and upper trigger circuits to bias same to differential triggering potentials, a diode having its positive terminal connected to the anode of the second vacuum tube of of said upper trigger circuit, a second diode having its negative terminal connected to the anode of the second vacuum tube of said lower trigger circuit and its positive terminal connected to the negative terminal of said first diode, a capacitor having one side connected to the junction of said first and second diodes and the other side connected to ground, a third diode having its positive terminal connected to said junction, a vacuum tube having at least anode, grid, and cathode elements, said anode connected to the negative terminal of said third diode, said grid connected to said first threshold bias means, said cathode connected to the cathodes of said lower trigger circuit vacuum tubes, and anticoincidence output means coupled to the negative terminal of said third diode.

15. A multi-channel pulse height discriminator comprising a plurality of trigger circuits fed from a common source of input pulses and preset to trigger at selected differential potential levels, said trigger circuits generating output pulses in response to triggering by said input pulses, each trigger circuit being of a type which exhibits hysteresis action to generate a hysteresis pulse just prior to the trailing edge of an output pulse therefrom, pulse generating means respectively coupled between the outputs of adjacent pairs of said trigger circuits for generating an inhibitor pulse extending in time between the leading edge of an output pulse from the trigger circuit of upper bias level and the trailing edge of an output pulse from the trigger circuit of lower bias level of said pairs, and anticoincidence output means coupled between each one of said pulse generating means and the corresponding lower bias level trigger circuit coupled thereto in receiving relation to said hysteresis pulses and inhibitor pulses.

16. A multi-channel differential discriminator comprising a plurality of Schmitt trigger circuits each including first and second vacuum triodes with the anode of the first coupled to the grid of the second triode and the cathodes of the first and second triodes commonly connected through a cathode resistor to ground, said trigger circuits generating output pulses at the second triode anodes in response to triggering and hysteresis pulses at the common cathode connection of the first and second triodes, threshold bias means coupled to each one of said trigger circuits to bias same to predetermined differential triggering levels, a common source of input pulses coupled to the grids of the first triodes of said plurality of trigger circuits, anode bias means coupled to the anodes of the first and second triodes of said trigger circuits, a plurality of inhibitor circuits respectively coupled between the second triode anodes of each adjacent pair of said trigger circuits and coupled to the common cathode connection of the first and second triodes of the lower bias level trigger circuit of the pair, each inhibitor circuit including means for responsively generating an inhibitor pulse extending in time between the leading edge of an output pulse from the trigger circuit of upper bias level and the trailing edge of an output pulse from the trigger circuit of lower bias level of each corresponding pair thereof, said inhibitor circuits further each including anticoincidence means in receiving relation to said hysteresis pulses generated at the first and second triode common cathodes of the lower bias level trigger circuit of the corresponding adjacent pair thereof and said inhibitor pulses for generating an output pulse only in response to said hysteresis pulses alone, and a plurality of output terminals respectively coupled to said plurality of inhibitor circuits in receiving relation to the output pulses generated therein.

17. A multi-channel differential discriminator as defined by claim 16 wherein said inhibitor circuits each comprise a first diode having its positive terminal connected to the second triode anode of the upper bias trigger circuit of the corresponding pair thereof, a second diode having its negative terminal connected to the second triode anode of the lower bias trigger circuit of said pair thereof and its positive terminal connected to the negative terminal of said first diode, a third diode having its negative terminal connected to the first and second triode cathodes of said lower bias trigger circuit and its positive terminal capacitively coupled to the junction of said first and second diodes, a resistor connected between the positive terminal of said third diode and said threshold bias means coupled to said lower bias level trigger circuit, a fourth diode having its negative terminal connected to the junction of said first and second diodes and its positive terminal coupled to the corresponding one of said output terminals, a bias resistor connected between the positive terminal of said fourth diode and said anode bias means, an output bias source, and an output resistor connected between said output bias source and the positive terminal of said fourth diode.

18. A multi-channel differential discriminator as defined by claim 16 wherein said inhibitor circuits each comprise a first diode having its positive terminal connected to the second triode anode of the upper bias trigger circuit of the corresponding adjacent pair thereof, a second diode having its negative terminal connected to the second triode anode of the lower bias trigger circuit of said pair thereof and its positive terminal connected to the negative terminal of said first diode, a capacitor having one side connected to the junction of said first and second diodes and the other side connected to ground, a third diode having its positive terminal connected to said junction, a fourth diode having its negative terminal connected to the first and second triode cathodes of said lower bias trigger circuit, a capacitor connected between the positive terminal of said fourth and the negative terminal of said third diode, a resistor connected between the positive terminal of said fourth diode and said threshold bias means coupled to said lower bias level trigger circuit, a fifth diode having its negative terminal connected to the negative terminal of said third diode and its positive terminal connected to the corresponding one of said output terminals, and positive bias means coupled to the positive terminal of said fifth diode.

19. A multi-channel differential discriminator as defined by claim 11 wherein said inhibitor circuits each comprise a first diode having its positive terminal connected to the second triode anode of the upper bias trigger circuit of the corresponding adjacent pair thereof, a second diode having its negative terminal connected to the second triode anode of the lower bias trigger circuit of said pair thereof and its positive terminal connected to the negative terminal of said first diode, a capacitor having one side connected to the junction of said first and second diodes and the other side connected to ground, a third diode having its positive terminal connected to said junction, a vacuum tube having at least anode, grid and cathode elements, said anode connected to the negative terminal of said third diode, said grid coupled to said threshold bias means coupled to said lower bias level trigger circuit, said cathode connected to the first and second triode cathodes of said lower bias level trigger circuit, a fourth diode having its negative terminal connected to the negative terminal of said third diode and its positive terminal connected to the corresponding one of said output terminal, a bias resistor connected between the positive terminal of said fourth diode and said anode bias means, an output bias source, and an output resistor connected between the positive terminal of said fourth diode and said output bias source.

References Cited in the file of this patent

UNITED STATES PATENTS

| | | |
|---|---|---|
| 2,694,146 | Fairstein | Nov. 9, 1954 |
| 2,760,064 | Bell | Aug. 21, 1956 |